(12) United States Patent
Davidson et al.

(10) Patent No.: US 8,683,868 B2
(45) Date of Patent: Apr. 1, 2014

(54) HAND-TIGHTENED PRESSURE TRANSDUCER

(75) Inventors: Glen W. Davidson, Roseville, MN (US); Thomas E. Pauly, Zimmerman, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 202 days.

(21) Appl. No.: 13/258,567

(22) PCT Filed: Mar. 24, 2010

(86) PCT No.: PCT/US2010/028414
§ 371 (c)(1), (2), (4) Date: Sep. 22, 2011

(87) PCT Pub. No.: WO2010/111333
PCT Pub. Date: Sep. 30, 2010

(65) Prior Publication Data
US 2012/0017694 A1    Jan. 26, 2012

Related U.S. Application Data

(60) Provisional application No. 61/163,599, filed on Mar. 26, 2009.

(51) Int. Cl.
*G01L 7/00* (2006.01)

(52) U.S. Cl.
USPC .................... 73/756; 73/700; 73/753

(58) Field of Classification Search
None
See application file for complete search history.

(56) References Cited

U.S. PATENT DOCUMENTS

| | | | |
|---|---|---|---|
| 2,049,104 A | 4/1935 | Charlton | |
| 2,067,773 A | 7/1936 | Long | |
| 3,527,478 A | 9/1970 | Enssle | |
| 3,820,381 A * | 6/1974 | Thurston | 73/40 |
| 3,877,721 A * | 4/1975 | Brown, Jr. | 280/736 |
| 4,081,988 A | 4/1978 | Change et al. | |
| 4,297,891 A | 11/1981 | Falcon | |
| 4,342,220 A * | 8/1982 | Catchpole et al. | 73/49.7 |
| 4,453,411 A * | 6/1984 | Shikasho | 73/709 |
| 4,550,611 A * | 11/1985 | Czarnocki | 73/708 |
| 4,672,728 A * | 6/1987 | Nimberger | 29/890.142 |

(Continued)

FOREIGN PATENT DOCUMENTS

| | | |
|---|---|---|
| DE | 19616658 A1 | 9/1997 |
| EP | 0310975 A2 | 4/1989 |
| JP | 9166512 A | 6/1997 |

OTHER PUBLICATIONS

Graco's Mark X Texture Sprayer, Jul. 2008 revision, with alternative method of removing/installing transducers on pp. 69-71.

*Primary Examiner* — Lisa Caputo
*Assistant Examiner* — Jermaine Jenkins
(74) *Attorney, Agent, or Firm* — Douglas B. Farrow

(57) ABSTRACT

A transducer, generally 10, has a robust, yet very flexible, steel-braid reinforced protective cover 12 which is permanently assembled to a custom machined fitting 14. A typical pressure transducer 16 is threaded through a SST nut 18 and then through the cover 12. Bonding the transducer body to the cover's fitting 14 captures the nut 18 between a flange 16A on the transducer 16 and a shoulder 18A in the nut 18, allowing the nut 18 to be freespinning yet a permanent part of the assembly 10.

1 Claim, 5 Drawing Sheets

(56) References Cited

U.S. PATENT DOCUMENTS

| | | | | |
|---|---|---|---|---|
| 5,067,750 A | | 11/1991 | Minneman | |
| 5,131,680 A | * | 7/1992 | Coultas et al. | 280/737 |
| 5,429,209 A | | 7/1995 | Shimabuku | |
| 5,487,569 A | | 1/1996 | Silvis et al. | |
| 5,743,235 A | * | 4/1998 | Lueder | 123/468 |
| 5,834,638 A | * | 11/1998 | Taylor et al. | 73/114.43 |
| 5,947,671 A | | 9/1999 | Kanaan et al. | |
| 6,349,753 B1 | * | 2/2002 | Lawson et al. | 152/209.1 |
| 6,672,171 B2 | * | 1/2004 | Gu et al. | 73/724 |
| 6,994,380 B2 | | 2/2006 | Cooke, Jr. | |
| 7,118,138 B1 | | 10/2006 | Rowley et al. | |
| 7,305,325 B2 | * | 12/2007 | Kostyk et al. | 702/183 |
| 7,309,084 B2 | | 12/2007 | Cooke, Jr. | |
| 7,455,395 B2 | * | 11/2008 | Wilson et al. | 347/85 |
| 7,464,600 B2 | * | 12/2008 | Kurtz et al. | 73/714 |
| 8,544,689 B2 | * | 10/2013 | Bertram et al. | 222/145.6 |
| 2008/0072877 A1 | | 3/2008 | Kurtz et al. | |

* cited by examiner

HAND-TIGHTENED PRESSURE TRANSDUCER

TECHNICAL FIELD

This application claims the benefit of U.S. Application Ser. No. 61/163,599, filed Mar. 26, 2009, the contents of which are hereby incorporated by reference.

BACKGROUND ART

Disclosure of the Invention

The instant invention permits the easy removal and replacement of a pressure transducer while protecting the body and cable of the sensor from damage while in service and/or twisting during removal or assembly.

A robust, yet very flexible, steel-braid reinforced protective cover is permanently assembled to a custom machined fitting. A typical pressure transducer is threaded through a SST nut and then through the cover. Bonding the transducer body to the cover's fitting captures the nut between a flange on the transducer and a shoulder in the nut, allowing the nut to be freespinning yet a permanent part of the assembly.

The other end of the cover is fastened to the sprayer frame, preventing the cover (and therefore the bonded transducer) from spinning during installation or removal from the fluid manifold. In use, the nut is hand-tightened into the manifold, presenting the end of the transducer to the system's fluid pressure. Loosening the nut forcibly draws the transducer from the manifold even if contamination or dried media is attempting to retain the transducer. Although intended to be removable by hand, a pair of wrench flats are also provided on the nut in case the user is unable to break the nut free from thread corrosion or similar contamination.

The fragile transducer cable is protected from job site & transportation hazards by the robust cover, which also mounts the assembly to the sprayer cart and prevents the cable from getting twisted during installation/removal of the transducer from the fluid manifold. The hand-tightenable nut provides quick, toolless installation and forcibly extracts the transducer from the manifold during removal.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
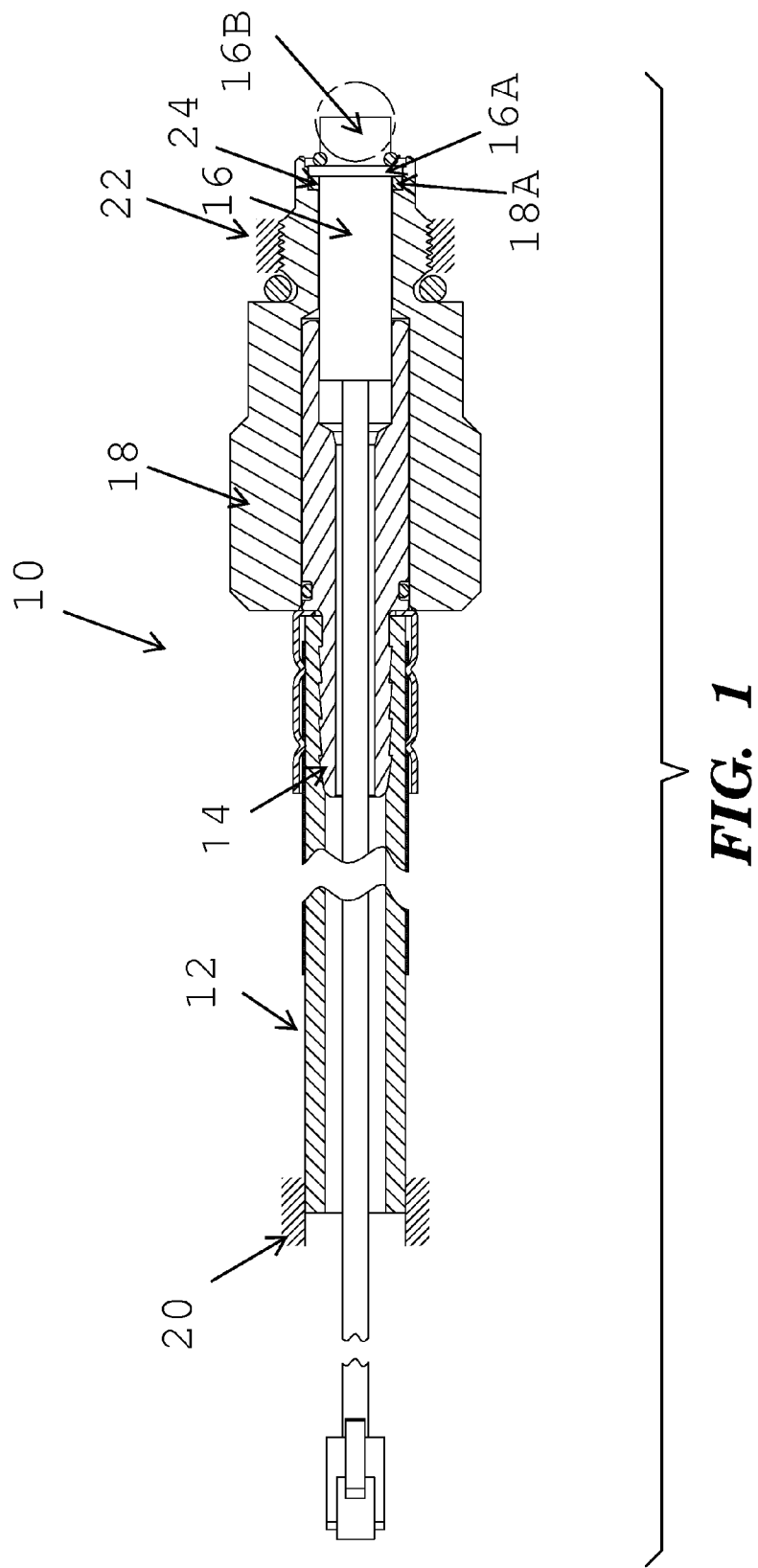
FIG. 1 is a longitudinal cross-section of the pressure transducer of the instant invention.
Figure 2:
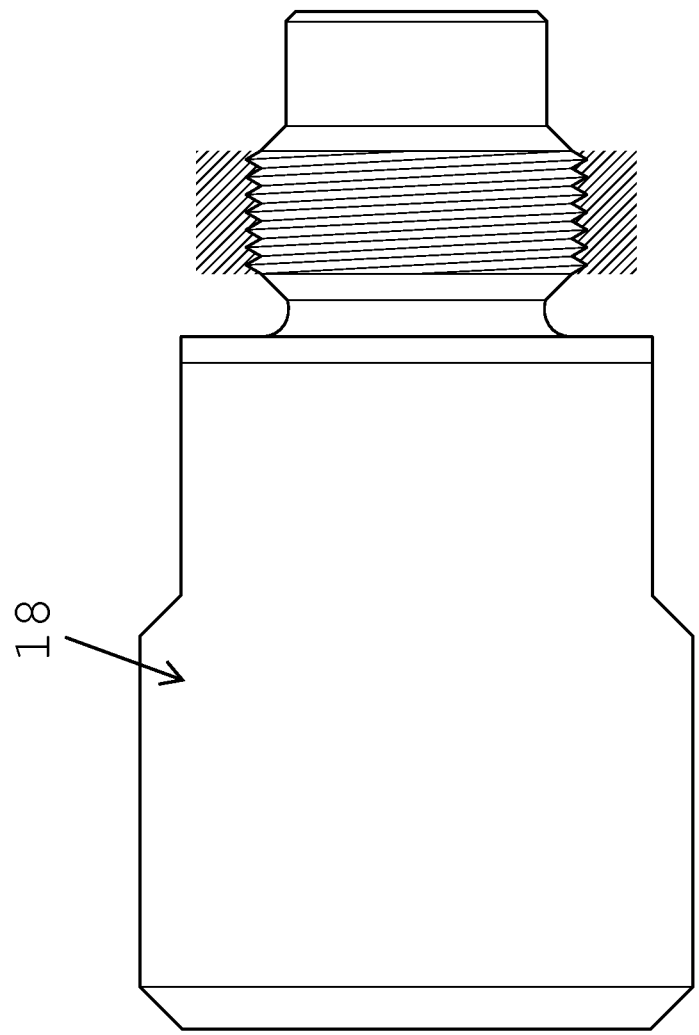
FIG. 2 is an external view of the freespinning nut.
Figure 3:
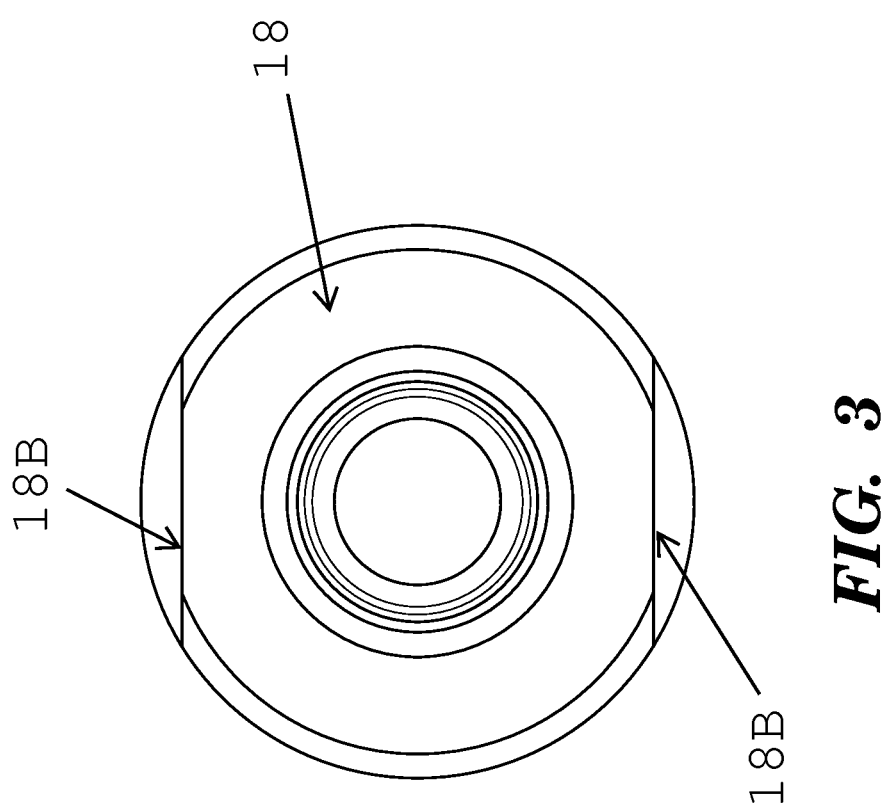
FIG. 3 is an end view of the freespinning nut.
Figure 4:
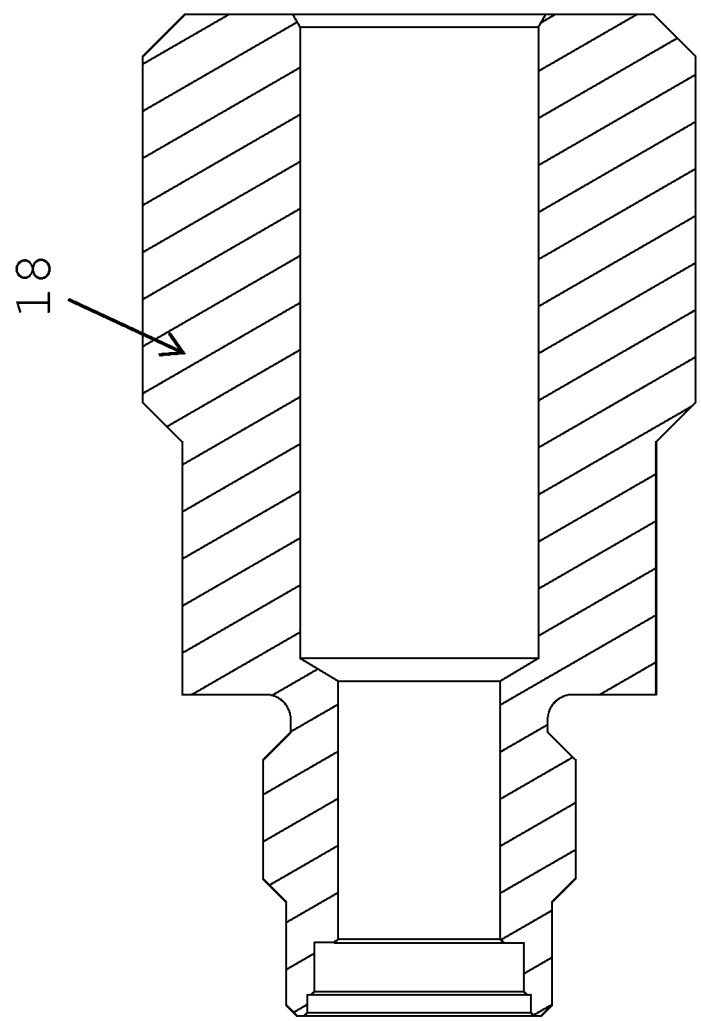
FIG. 4 is a cross-sectional view of the freespinning nut.
Figure 5:
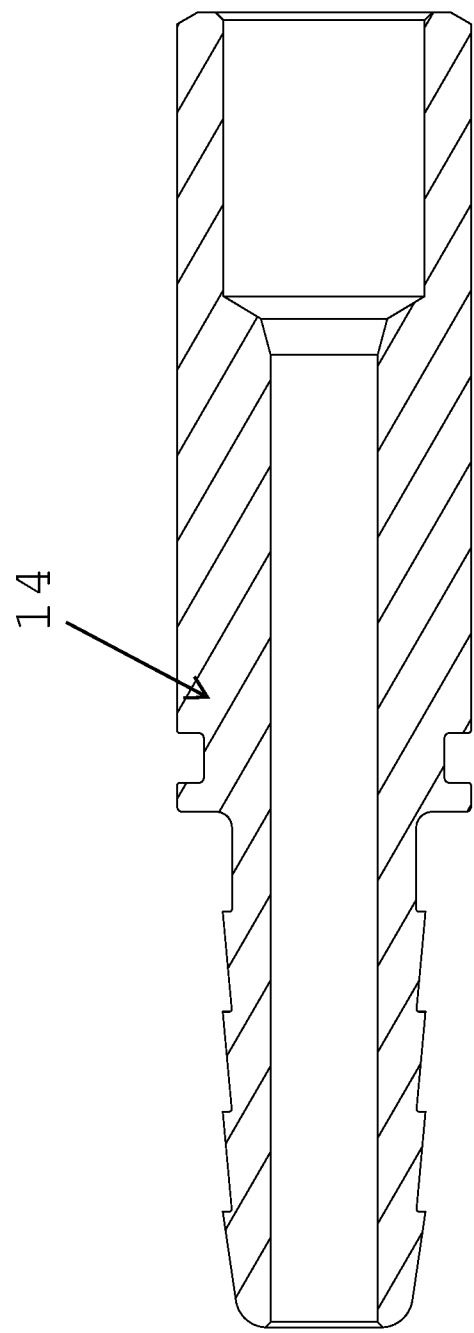
FIG. 5 is a cross-sectional view of the brass fitting.

The transducer, generally 10, of the instant invention, has a robust, yet very flexible, steel-braid reinforced protective cover 12 which is permanently assembled to a custom machined fitting 14. A typical pressure transducer 16 is threaded through a SST nut 18 and then through the cover 12. Bonding the transducer body to the cover's fitting 14 captures the nut 18 between a flange 16A on the transducer 16 and a shoulder 18A in the nut 18, allowing the nut 18 to be freespinning yet a permanent part of the assembly 10. A thrust washer 24 allows rotation between flange 16A and shoulder 18A.

The other end of the cover 12 is fastened to the sprayer frame 20, preventing the cover 12 (and therefore the bonded transducer 16) from spinning during installation or removal from the fluid manifold. In use, the nut 18 is hand-tightened into the manifold 22, presenting the pressure sensing end 16B of the transducer 16 to the system's fluid pressure. Loosening the nut 18 forcibly draws the transducer 16 from the manifold 22 even if contamination or dried media is attempting to retain the transducer 22. Although intended to be removable by hand, a pair of wrench flats 18B are also provided on the nut 18 in case the user is unable to break the nut 18 free from thread corrosion or similar contamination.

The fragile transducer cable is protected from job site & transportation hazards by the robust cover, which also mounts the assembly to the sprayer cart and prevents the cable from getting twisted during installation/removal of the transducer from the fluid manifold. The hand-tightenable nut provides quick, toolless installation and forcibly extracts the transducer from the manifold during removal.

It is contemplated that various changes and modifications may be made to the pressure transducer without departing from the spirit and scope of the invention as defined by the following claims.

The invention claimed is:

1. A pressure transducer assembly for threading into a manifold, said transducer assembly comprising:
   a pressure transducer having an electrical cable, a pressure sensing end and a distal end and a flange adjacent said pressure sensing end, said cable extending from said distal end; and
   a nut rotatably captured on said transducer, said nut being threadable into said manifold to present said pressure sensing end to a pressure to be sensed and being shaped so as to allow hand tightening or loosening and further comprising wrench flats for such purpose in order to allow said nut to pull said transducer from said manifold upon loosening.

* * * * *